July 4, 1939.  C. L. HOFF  2,164,921
MOTOR VEHICLE CONTROL
Filed Feb. 17, 1937  2 Sheets-Sheet 1
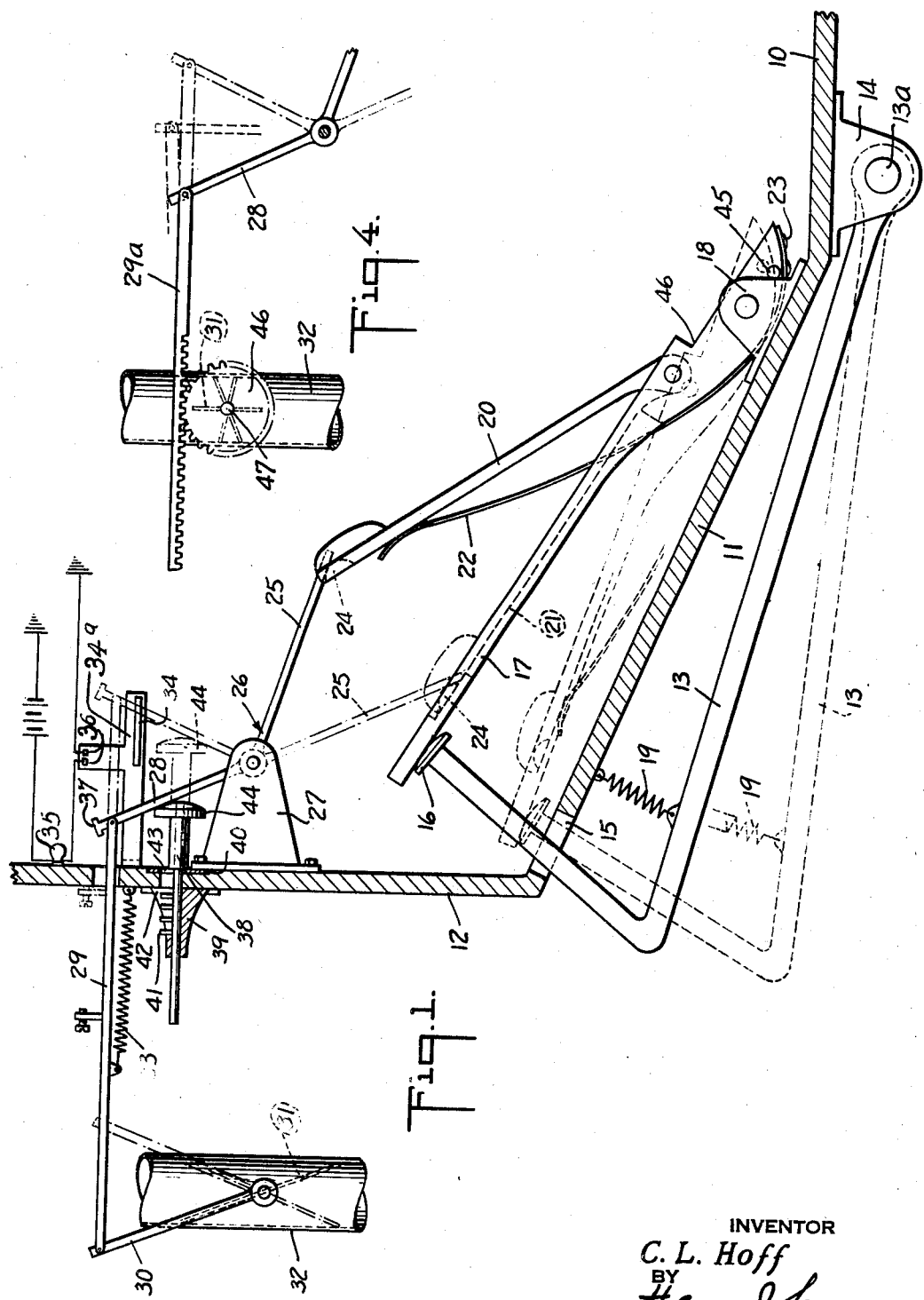
INVENTOR
C. L. Hoff
BY
Henry J Savage
ATTORNEY

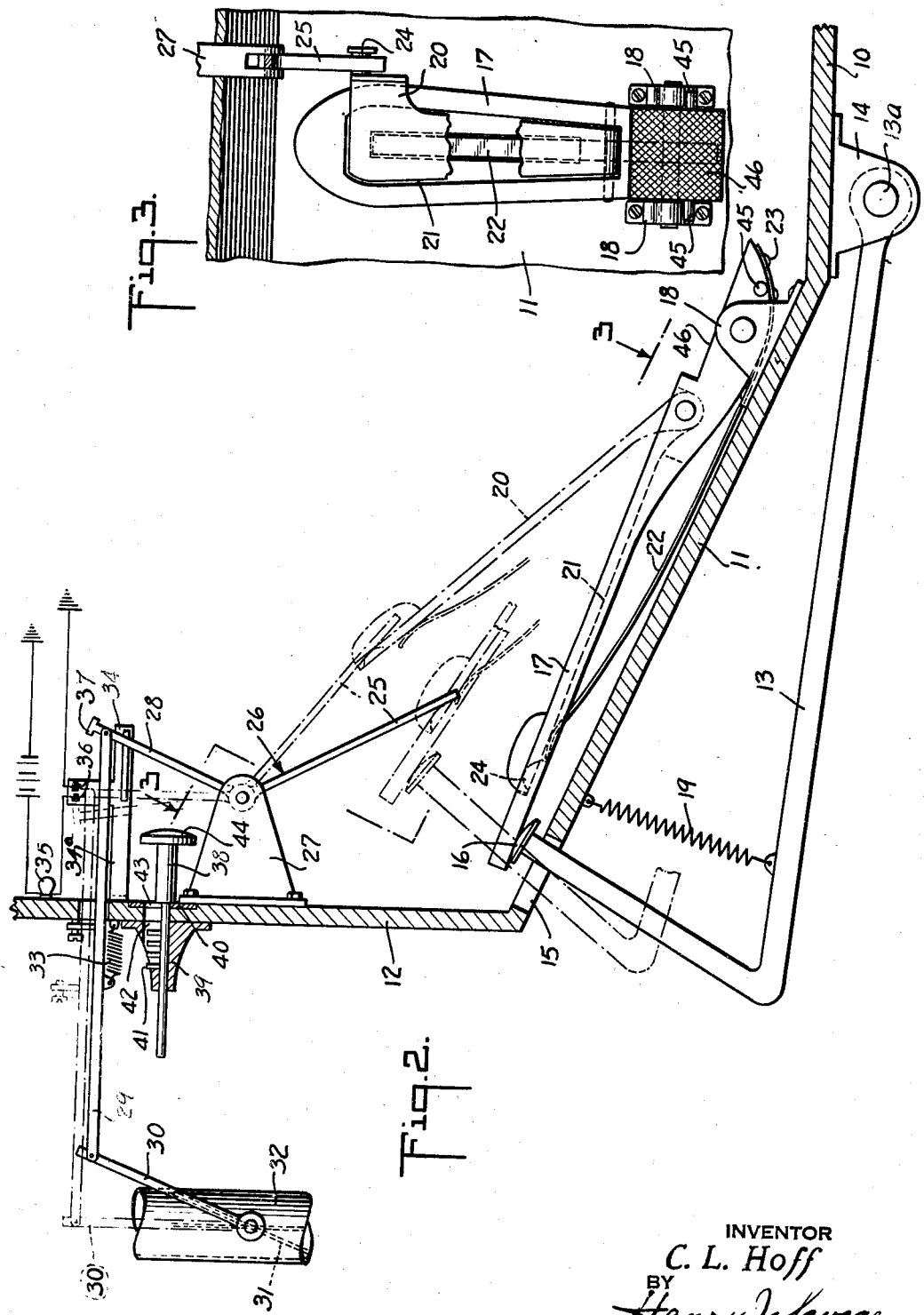

Patented July 4, 1939

2,164,921

UNITED STATES PATENT OFFICE 2,164,921

MOTOR VEHICLE CONTROL

Carlton L. Hoff, York, Pa.

Application February 17, 1937, Serial No. 126,146

19 Claims. (Cl. 192—3)

My invention relates to motor vehicle control and particularly to a combined safety brake and throttle control for automobiles.

In automobiles as now constructed the brake and throttle (or accelerator, as it is commonly called) are independently mounted and operated, although both are operated by the right foot and in the same direction, but to produce opposite results. That is, the right foot is pressed down on the accelerator button or pedal to cause the car to speed up and the same foot is pressed down on the brake pedal to retard it. This is an anomaly that unquestionably contributes to many accidents, especially with inexperienced drivers who have not yet become so used to driving that they operate the controls instinctively. Also many drivers, especially those of little experience or of nervous temperament, or when frightened in an emergency, instinctively "stiffen at the wheel", with the result that they press down on the accelerator pedal and cause the car to jump ahead when it should be slowed up or brought to a stop by the brake pedal. This contributes to many accidents that would be avoided or at least minimized, if the driver had only applied the brake instead of "stepping on the gas". Also, in present cars, when the driver becomes fatigued, relaxes, or falls asleep at the wheel, the weight of his foot is sufficient to depress the accelerator button and speed up the car to his own great peril and other cars on the road.

Having the above defects and dangers of present automobile control systems in mind, I have developed my safety brake and throttle control so that the instinctive reactions and relaxations of the driver will close the throttle and apply the brake, and, in case the driver's foot should be entirely removed from or slip off the control pedal, to stop the engine. I accomplish this by coordinating the throttle control with the brake pedal so that both are controlled by the same foot in the same position, the throttle control being urged upward against the pressure of the foot to open the throttle and a downward movement of the foot in the same position both closing the throttle and applying the brake. I also provide means whereby the opening movement of the throttle may be limited so that the engine speed may not exceed a predetermined maximum. I also provide a signal, which preferably is visible but may be an audible or other signal, to indicate to the driver when the throttle is in its maximum open position. Another advantage and safety feature of my invention is that the engine cannot be started until the driver depresses the throttle pedal to operative position. Still another advantage is that when the car is stopped on an uphill grade where it must be held by the brake, it is not necessary to shift the foot from the brake pedal to the throttle pedal, during which time the car may start to drift backward, but when the brake is released the engine is simultaneously accelerated.

With the above and other advantages and objects in view, I have illustrated one embodiment of my invention in the accompanying drawings wherein:

Fig. 1 is a sectional view through the dash and floor of an automobile showing my combined brake and throttle control with the throttle control in one extreme position and the brake pedal in released or non-operative position.

Fig. 2 is the same view with the brake pedal depressed and the throttle in idling position.

Fig. 3 is a top plan view of the brake and throttle pedals taken substantially on the line 3—3 of Fig. 2.

Fig. 4 shows a different connection to the throttle valve.

On the drawings 10 indicates the floor of an automobile having the upwardly inclined extension or foot board 11 which with the dash 12 closes off the car body from the motor compartment. A brake arm 13 is fixed to a shaft 13a supported in the bracket 14 and extends through an opening 15 in the foot board. A button or head 16 on the brake arm is engaged by the free end of a brake pedal 17 hinged at its rear end to a bracket 18 secured to the floor of the car. The brake system of the vehicle may be of any desired construction, as mechanical, hydraulic or vacuum operated, and is connected to the shaft 13a to be actuated by movement of the arm 13 in the usual manner. A spring 19 normally holds the arm 13 and pedal 17 in raised position, as shown in full lines in Fig. 1, and the brakes released. The brakes are applied when the pedal and arm are depressed, as shown in dotted lines.

A throttle lever or pedal 20 is pivoted at one end on the brake pedal 17 which may be recessed at 21 to receive the lever, or the latter may overlie the pedal in any manner desired. A spring 22 is secured to the pedal 17 at 23 and its free end presses against the free end of the throttle lever 20, urging it to the full line position shown in Fig. 1 or the dotted line position of Fig. 2. The spring 22 is weaker than the spring 19, so that when pressure is applied to the lever 20, only the spring 22 will yield and the pedal 17 will not be depressed until after the lever 20 has been pressed down against it, after which the pedal and lever move together when the brakes are applied.

The lever or accelerator pedal 20 has a side extension or lug 24 on which one end 25 of a bent arm 26 rests. The arm is supported on a bracket 27 fixed to the dash 12 or any other suitable part of the vehicle and its upper end 28 is connected by a link 29 to the arm 30 of the throttle valve 31 in the intake pipe 32 of the engine. As shown in Fig. 2, a spring 33 connected to the dash 12 and link 29 urges the throttle valve 31 toward closed or idling position. This spring is weaker than the spring 22 to which it is opposed, so that the stronger spring 22, in conjunction with the position of the throttle lever 20, will determine the degree of opening of the throttle valve and engine speed.

A bracket 34a made from insulation material mounted on the dash and carries a contact 34 which may be connected in the ground side of the ignition system. The arm 28 in its normal range of movement slides in contact with this contact 34 so that a ground to the vehicle frame is provided and the ignition system operative. When the arm 28 moves out of contact with the contact 34, the ground side is opened and the ignition system made inoperative so that the engine cannot be run. In this inoperative position, the throttle valve 31 is thrown all the way through open position over to closed position as shown by full lines in Fig. 1. This is a safety feature of the invention and this condition prevails when the throttle lever 20 is released from the restraining influence of the driver's foot and is snapped by the spring 22 to the full line position in this figure. If this should happen, the engine cannot be started again until the driver depresses the lever 20 and brings the arm 28 again back into contact with the contact 34.

The position of the throttle valve 31, and therefore the power or speed of the engine, is controlled by the position of the throttle lever 20, which in turn is controlled by the foot of the driver. When the engine is working under a heavy load, as when the car is ascending a steep grade, the operator may not know whether the throttle is in its maximum open position. If the engine is laboring hard, he may in trying to "give it more gas" release the lever 20 so far that the throttle valve 31 will pass its maximum opening and begin to close in the opposite direction, or the arm 28 will break contact with the contact 34. It is advisable, therefore, that the driver know when the maximum open position of the throttle is attained. For this purpose I provide a signal which will advise the driver when this maximum open position exists. This signal may be audible or visible, and I have shown it as a small light 35 mounted on the dash. Preferably this will be a small colored electric bulb that will be lighted when the throttle is wide open. A pair of contacts 36 are mounted on the bracket 34a and connected in a circuit with the light 35. The arm 28 has a head or contact 37 at its upper end and when it is in mid-position, as shown in dotted lines in Fig. 2, it bridges the gap between the contacts 36 and completes the circuit through the signal 35 whether it be a visible or audible signal.

At times, it may be desirable to limit the movement of the arm 26 and of the throttle valve 31. For this purpose I have provided the adjustable stop 38. This stop is mounted to slide in a guide 39 secured to the dash 12 and extends through a plate 40. The stop has a number of pins 41, the guide 39 being cut away at 42 so that the stop and pins may be turned through a half rotation. The plate 40 has a slot 43 which permits passage of the pins 41. The stop 38 has a head 44 adapted to abut the arm 28 and limit its movement as best shown in Fig. 1. The slot 43 permits passage of the pins 41, and the stop is then given a partial turn so that one of the pins engages the face of the plate 40 and retains the stop in its pulled-out position. By pulling the head 44 of the stop out the proper distance and then turning the stop so that one of the pins 41 engages the face of plate 40, the movement of the arm 28 may be restricted to any desired amount. When the stop is all the way out, the throttle will be held closed and the engine cannot be started until the stop is released.

In order to afford a firmer rest for the driver's foot and to prevent fatigue, an abutment or rest 45 is provided to limit upward movement of the brake pedal 17, as best shown in Figs. 1 and 3.

In Fig. 4, I have shown a different mechanism for operating the throttle valve 31. In place of the lever 30, I secure a pinion 46 to the shaft 47 of the valve 31. This gear meshes with a rack formed on the bar 29a connected to the arm 28.

In the operation of my invention, the driver places his foot on the throttle lever 20 and depresses it until the throttle valve is in the proper position for starting. The end 25 of the arm 26 rests loosely on the lug 24 and follows the throttle pedal down as it is depressed due to the pull of spring 33. The parts are adjusted so that the throttle is in idling position when the lever 20 is pushed down into contact with the brake pedal 17. The brake pedal remains in its full line position as shown in Fig. 1 until the throttle pedal or lever 20 is fully depressed because the spring 19 is stronger than spring 22. If the lever 20 is depressed beyond this point, the lug 24 will leave the arm 25 (see full line position, Fig. 2) and the brake and accelerator pedals will thereafter move downward together and the brakes will be applied. When the engine has been started, its speed is controlled by the foot of the operator which can pivot about his heel which rests in the heel rest 46 that is cut out for it in the pedal 17 directly over its hinged support. To speed up the engine, the operator tilts his toe upward and the spring 22 causes the lever 20 to follow it and open the throttle. To slow down the engine, the driver presses down with his foot, the first result of which is to start closing the throttle, but continued downward movement applies the brakes. It is not necessary for the driver to shift his foot from throttle to brake or vice versa to control the car. Both the throttle and brakes are controlled with the foot in the same position, the brake being operated by a continuation of the same movement that slows down the engine. In driving a car equipped with my invention, the driver must always be alert or the engine will stop and the car come to a standstill. Thus if he falls asleep at the wheel, or becomes fatigued, the weight of his foot will depress lever 20 and slow down or stop the car, while, if his foot should slip off, the arm 28 will leave the contact 34 (if that be used) and stop the engine, or the spring 22 will throw the throttle 31 over into opposite closed position, as shown in full lines in Fig. 1. Or the valve 31 may be adjusted so that it will not be entirely closed when in this "opposite" position but will permit the engine to idle provided the contact 34

2,164,921 be not used or if it is extended far enough so that contact is not broken with arm 28. In case of an emergency or fright where the driver obeys his instinct to press down with his feet, or "stiffen at the wheel", he will automatically close the throttle and apply the brakes thus avoiding an accident that would have occurred had his instinctive reaction been to "step on the gas."

Having thus described one form that my invention may take, I claim all modifications and equivalents thereof that come within the scope of my claims, it being understood that the terms used herein and the embodiment shown are but illustrative of the invention and not limitations thereon, but that it may be embodied in many other forms. Many other variations will suggest themselves to those skilled in this art, and I include all such that come within the spirit of my invention.

What I claim is:

1. In a motor vehicle, the combination of an intake pipe having a throttle valve therein, an accelerator lever pivotally supported on means supported on the foot-board of the vehicle, a spring urging said lever away from the foot-board about its pivotal connection, an accelerator arm pivotally supported intermediate its ends on the vehicle with one end resting on said accelerator lever, the other end of the arm being connected to actuate said throttle valve, a second spring urging said one end to follow said lever when the latter is depressed and to close said throttle valve, said first mentioned spring being adapted to raise said lever and open said throttle valve against the tension of said second spring.

2. In a motor vehicle, the combination of an intake pipe having a throttle valve therein, an accelerator lever pivotally supported on means supported on the foot-board of the vehicle, a spring urging said lever away from the foot-board about its pivotal connection, an accelerator arm pivotally supported intermediate its ends on the vehicle with one end resting on said accelerator lever, the other end of the arm being connected to actuate said throttle valve, a second spring urging said one end to follow said lever when the latter is depressed and to close said throttle valve, said first mentioned spring being adapted to raise said lever and open said throttle valve against the tension of said second spring and a signal controlled to operate when said arm is in mid-position and said throttle valve fully open.

3. In a motor vehicle, the combination of an intake pipe having a throttle valve, an accelerator lever pivotally supported at one end on means supported on the foot-board of the vehicle, said lever having a lateral lug near its free end, an accelerator arm pivoted to the vehicle intermediate its ends with one end resting on said lug, a spring forcing said free end and lug away from said foot-board, the other end of said arm being connected to said throttle valve, a second spring tending to close said valve and pressing said one end toward said lug, said first spring being stronger than the second spring and tending to open said throttle valve.

4. In a motor vehicle, the combination of an intake pipe having a throttle valve, an accelerator lever pivotally supported at one end on means supported on the foot-board of the vehicle, said lever having a lateral lug near its free end, an accelerator arm pivoted to the vehicle intermediate its ends with one end resting on said lug, a spring forcing said free end and lug away from said foot-board, the other end of said arm being connected to said throttle valve, a second spring tending to close said valve and pressing said one end toward said lug, said first spring being stronger than the second spring and tending to open said throttle valve and a signal operated when said throttle is fully open.

5. In a motor vehicle, the combination of a brake arm extending through the floor of the vehicle, a pedal pivotally mounted at one end on the vehicle floor and at its free end engaging said brake arm, an accelerator mounted on said pedal, means yieldably urging said accelerator away from said pedal, an intake pipe having a throttle valve therein, connections between said accelerator and throttle valve whereby movement of the accelerator away from said pedal will open said throttle valve, and yieldable means operating through said connections to close said throttle valve upon movement of said accelerator toward said pedal.

6. In a motor vehicle, the combination of a brake pedal hinged at one end to the floor of the vehicle, a spring urging the free end of the pedal away from the floor, a throttle lever hinged at one end to the brake pedal and overlying the same, a spring urging the free end of the throttle lever upward away from the brake pedal, the first named spring being stronger than the second spring, a throttle valve, and connections between said throttle lever and throttle valve whereby upward movement of said throttle lever under the influence of said second spring will open said valve.

7. In a motor vehicle, the combination of a brake pedal hinged at one end to the floor of the vehicle, a spring urging the free end of the pedal upwardly away from the floor, a throttle lever overlying said brake pedal and hinged thereto at one end, a second spring urging said throttle lever upwardly away from the brake pedal, a throttle valve, connections between said valve and lever whereby upward movement of said lever by said second spring will open said valve and downward movement against said second spring will close said valve, a brake operating arm extending through said floor adapted to be engaged by said pedal upon downward movement thereof, said brake pedal spring imposing a greater resistance to downward movement than said throttle lever spring whereby downward pressure will first depress said lever to close the throttle and continued downward pressure will then depress the brake pedal and actuate the brake operating arm.

8. In a motor vehicle, the combination of a brake arm extending through the floor of the vehicle, a pedal pivotally mounted at one end on the vehicle floor and at its free end engaging said brake arm, an accelerator mounted on said pedal, means yieldably urging said accelerator away from said pedal, an intake pipe having a throttle valve therein, connections between said accelerator and throttle valve whereby movement of the accelerator away from said pedal will open said throttle valve a signal connected to be operated when said throttle valve is fully opened, and yieldable means operating through said connections to close said throttle valve upon movement of said accelerator toward said pedal.

9. In a motor vehicle of the type having an engine mounted thereon for propelling it, the combination of a brake arm extending through the floor of the vehicle, a pedal pivotally mounted at one end on the vehicle floor and at its free end engaging said brake arm, an accelerator mounted on said pedal, means yieldably urging said accelerator away from said pedal, an intake pipe having a throttle valve therein, connections between said accelerator and throttle valve whereby movement of the accelerator away from said pedal will open said throttle valve, and means operative when said throttle valve is turned beyond its maximum open position to render the vehicle engine inoperative.

10. In a motor vehicle, the combination of a brake arm extending through the floor of the vehicle, a pedal pivotally mounted at one end on the vehicle floor and at its free end engaging said brake arm, an accelerator mounted on said pedal, means yieldably urging said accelerator away from said pedal, an intake pipe having a throttle valve therein, connections between said accelerator and throttle valve whereby movement of the accelerator away from said pedal will open said throttle valve and adjustable means to limit the maximum opening of said throttle valve.

11. In a motor vehicle, the combination of a brake pedal hinged at one end to the floor of the vehicle, a spring urging the free end of the pedal upwardly away from the floor, a throttle lever overlying said brake pedal and hinged thereto at one end, a second spring urging said throttle lever upwardly away from the brake pedal, a throttle valve, connections between said valve and lever whereby upward movement of said lever by said second spring will open said valve and downward movement against said second spring will close said valve, a brake operating arm extending through said floor adapted to be engaged by said pedal upon downward movement thereof, said brake pedal spring imposing a greater resistance to downward movement than said throttle lever spring whereby downward pressure will first depress said lever to close the throttle and continued downward pressure will then depress the brake pedal and actuate the brake operating arm, and a signal connected to be operated when said throttle valve is fully opened.

12. In a motor vehicle of the type that is propelled by an engine mounted thereon, the combination of a brake pedal hinged at one end to the floor of the vehicle, a spring urging the free end of the pedal upwardly away from the floor, a throttle lever overlying said brake pedal and hinged thereto at one end, a second spring urging said throttle lever upwardly away from the brake pedal, a throttle valve, connections between said valve and lever whereby upward movement of said lever by said second spring will open said valve and downward movement against said second spring will close said valve, a brake operating arm extending through said floor adapted to be engaged by said pedal upon downward movement thereof, said brake pedal spring imposing a greater resistance to downward movement than said throttle lever spring whereby downward pressure will first depress said lever to close the throttle and continued downward pressure will then depress the brake pedal and actuate the brake operating arm, and means operative when said throttle valve is turned beyond its maximum open position to render the vehicle engine inoperative.

13. In a motor vehicle, the combination of a brake pedal hinged at one end to the floor of the vehicle, a spring urging the free end of the pedal upwardly away from the floor, a throttle lever overlying said brake pedal and hinged thereto at one end, a second spring urging sad throttle lever upwardly away from the brake pedal, a throttle valve, connections between said valve and lever whereby upward movement of said lever by said second spring will open said valve and downward movement against said second spring will close said valve, a brake operating arm extending through said floor adapted to be engaged by said pedal upon downward movement thereof, said brake pedal spring imposing a greater resistance to downward movement than said throttle lever spring whereby downward pressure will first depress said lever to close the throttle and continued downward pressure will then depress the brake pedal and actuate the brake operating arm, and adjustable means to limit the maximum opening of said throttle valve.

14. In a motor vehicle, the combination of a brake pedal arranged so that downward movement of the pedal will actuate the vehicle brakes and upward movement will release them, a throttle lever mounted on said brake pedal, yieldable means urging said lever upward away from said pedal, a throttle valve controlling the vehicle motor, connections between said lever and throttle valve whereby movement of the lever upward under the influence of said yieldable means will open said valve and downward movement will close it, the throttle lever being movable downward with the pedal so that simultaneous downward movement of both will close the throttle and apply the brakes.

15. In a motor vehicle of the type that is driven from an engine having an electrical ignition system, the combination of a motor control arm extending through the floor of the vehicle, a pedal pivotally mounted at one end on the vehicle floor and at its free end engaging said motor control arm, an accelerator mounted on said pedal, means yieldably urging said accelerator away from said pedal, an intake pipe having a throttle valve therein, said throttle valve being adapted to be turned to closed position at either side of its maximum open position, connections between said accelerator and throttle valve whereby movement of the accelerator away from said pedal will move said throttle valve from closed toward maximum open position, and means operable when said valve passes its maximum open position to interrupt the ignition system.

16. In a motor vehicle of the type that is driven from an engine having an electrical ignition system, the combination of a motor control arm extending through the floor of the vehicle, a pedal pivotally mounted at one end on the vehicle floor and at its free end engaging said motor control arm, an accelerator mounted on said pedal, means yieldably urging said accelerator away from said pedal, an intake pipe having a throttle valve therein, said throttle valve being adapted to be turned to close position at either side of its maximum open position, connections between said accelerator and throttle valve whereby movement of the accelerator away from said pedal will move said throttle valve from closed toward maximum open position, means operable when said valve passes its maximum open position to interrupt the ignition system and adjustable means to limit the amount said throttle valve may turn beyond its maximum open position.

17. In a motor vehicle of the type having an engine thereon controlled by a throttle valve, the combination of an intake pipe, a throttle valve therein that will close the intake pipe in either of its extreme positions, an accelerator mounted on the vehicle to be actuated by the foot of the operator, connections between said throttle valve and accelerator whereby downward movement of the accelerator by the foot of the operator will move said throttle valve from open position toward closed position in one direction, and means operating to close said throttle valve in tre opposite direction when the accelerator is released from the foot of the operator.

18. In a motor vehicle, the combination of an engine intake pipe, a throttle valve therein adapted to close the same in either of its extreme positions and to open the intake pipe to its maximum capacity when in mid-position, an accelerator mounted on the vehicle to be actuated by the foot of the operator, connections between said throttle valve and accelerator whereby downward movement of the accelerator by the operator's foot will move said throttle valve from its mid-position toward closed position in one direction, and means operating to render said vehicle inoperable upon upward movement of said accelerator and movement of said throttle valve beyond its mid-position in the opposite direction.

19. In a motor vehicle of the type that is driven from an internal combustion engine, the combination of a pedal pivotally mounted on the vehicle so as to be actuated by the foot of the operator, an accelerator mounted on said pedal, means yieldingly urging said accelerator away from said pedal, an intake pipe having a throttle valve therein, said throttle valve being adapted to be turned to closed position at either side of its maximum open position, connections between said accelerator and throttle valve whereby movement of the accelerator away from said pedal will turn said throttle valve from closed position on one side toward maximum open position, and yeldable means tending to turn said throttle valve through open position to closed position on the opposite side.

CARLTON L. HOFF.